(12) United States Patent
Matus et al.

(10) Patent No.: US 9,996,811 B2
(45) Date of Patent: Jun. 12, 2018

(54) SYSTEM AND METHOD FOR ASSESSING RISK THROUGH A SOCIAL NETWORK

(71) Applicant: Zendrive, Inc., San Francisco, CA (US)

(72) Inventors: Jonathan Matus, San Francisco, CA (US); Pankaj Risbood, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 480 days.

(21) Appl. No.: 14/566,408

(22) Filed: Dec. 10, 2014

(65) Prior Publication Data

US 2015/0161538 A1  Jun. 11, 2015

Related U.S. Application Data

(60) Provisional application No. 61/914,182, filed on Dec. 10, 2013.

(51) Int. Cl.
*G06Q 40/00* (2012.01)
*G06Q 10/06* (2012.01)
*G06Q 40/08* (2012.01)
*G06Q 50/00* (2012.01)

(52) U.S. Cl.
CPC ......... *G06Q 10/0635* (2013.01); *G06Q 40/08* (2013.01); *G06Q 50/01* (2013.01)

(58) Field of Classification Search
CPC .................................................. G06Q 40/00
USPC .......................................................... 705/35
See application file for complete search history.

(56) References Cited

U.S. PATENT DOCUMENTS

| | | | |
|---|---|---|---|
| 6,049,778 A * | 4/2000 | Walker | G06Q 30/02 705/14.14 |
| 6,055,477 A | 4/2000 | McBurney et al. | |
| 8,054,168 B2 | 11/2011 | McCormick et al. | |
| 8,577,703 B2 | 11/2013 | Mcclellan et al. | |
| 8,634,822 B2 | 1/2014 | Silver et al. | |
| 2004/0082311 A1 | 4/2004 | Shiu et al. | |
| 2008/0033776 A1 * | 2/2008 | Marchese | G06Q 20/10 705/7.33 |
| 2008/0103907 A1 * | 5/2008 | Maislos | G06F 17/30867 705/14.54 |
| 2010/0100398 A1 * | 4/2010 | Auker | G06Q 10/087 705/4 |
| 2010/0106406 A1 | 4/2010 | Hille et al. | |
| 2010/0299021 A1 | 11/2010 | Jalili | |
| 2011/0077028 A1 | 3/2011 | Wilkes, III et al. | |
| 2011/0161116 A1 | 6/2011 | Peak et al. | |
| 2011/0294520 A1 | 12/2011 | Zhou et al. | |
| 2012/0050095 A1 | 3/2012 | Scherzinger et al. | |
| 2012/0066053 A1 * | 3/2012 | Agarwal | G06Q 30/02 705/14.41 |
| 2012/0136529 A1 | 5/2012 | Curtis et al. | |
| 2012/0149400 A1 | 6/2012 | Paek et al. | |
| 2012/0226421 A1 | 9/2012 | Kote et al. | |
| 2012/0245963 A1 * | 9/2012 | Peak | G06Q 50/01 705/4 |
| 2013/0006469 A1 | 1/2013 | Green et al. | |
| 2013/0041521 A1 | 2/2013 | Basir et al. | |
| 2013/0069802 A1 | 3/2013 | Foghel et al. | |

(Continued)

*Primary Examiner* — Kirsten S Apple

(74) *Attorney, Agent, or Firm* — Jeffrey Schox

(57) ABSTRACT

A method for assessing risk through a social network includes receiving user social network data, generating a risk map from the user social network data, and calculating a risk assessment based on the risk map and the user social network data.

22 Claims, 8 Drawing Sheets

(56) References Cited

U.S. PATENT DOCUMENTS

| | | |
|---|---|---|
| 2013/0211618 A1 | 8/2013 | Iachini |
| 2013/0316737 A1 | 11/2013 | Guba et al. |
| 2013/0317860 A1* | 11/2013 | Schumann, Jr. ........ G06Q 40/08 705/4 |
| 2013/0325517 A1* | 12/2013 | Berg ...................... G06Q 10/10 705/4 |
| 2013/0332357 A1* | 12/2013 | Green .................. G06Q 20/223 705/44 |
| 2014/0046896 A1* | 2/2014 | Potter ............... G06F 17/30554 707/603 |
| 2014/0081670 A1* | 3/2014 | Lim ....................... G06Q 10/10 705/4 |
| 2014/0232592 A1 | 8/2014 | Psiaki et al. |
| 2014/0244156 A1 | 8/2014 | Magnusson et al. |
| 2014/0288765 A1 | 9/2014 | Elwart et al. |
| 2015/0084757 A1 | 3/2015 | Annibale et al. |
| 2015/0097703 A1 | 4/2015 | Baur |
| 2015/0229666 A1* | 8/2015 | Foster .................... H04L 63/14 726/22 |

\* cited by examiner

SYSTEM AND METHOD FOR ASSESSING RISK THROUGH A SOCIAL NETWORK

CROSS-REFERENCE TO RELATED APPLICATIONS

This application claims the benefit of U.S. Provisional Application Ser. No. 61/914,182, filed on 10 Dec. 2013, which is incorporated in its entirety by this reference.

TECHNICAL FIELD

This invention relates generally to the insurance application field, and more specifically to a new and useful system and method for assessing risk through a social network.

BACKGROUND

When insuring a driver, insurance companies often rely on actuarial data based on age, gender, martial status, vehicle classification, driving distance, and driving history. Such individual features provide limited insight into a driver, and furthermore, do little to inform insurance companies about other drivers. Insurance companies would prefer to insure safe drivers, but it can be challenging to predict what drivers are safe, especially without receiving detailed personal information. Thus, there is a need in the insurance application field to create a new and useful system and method for assessing risk through a social network. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Predicting Risk Through a Social Network

Figure 1:
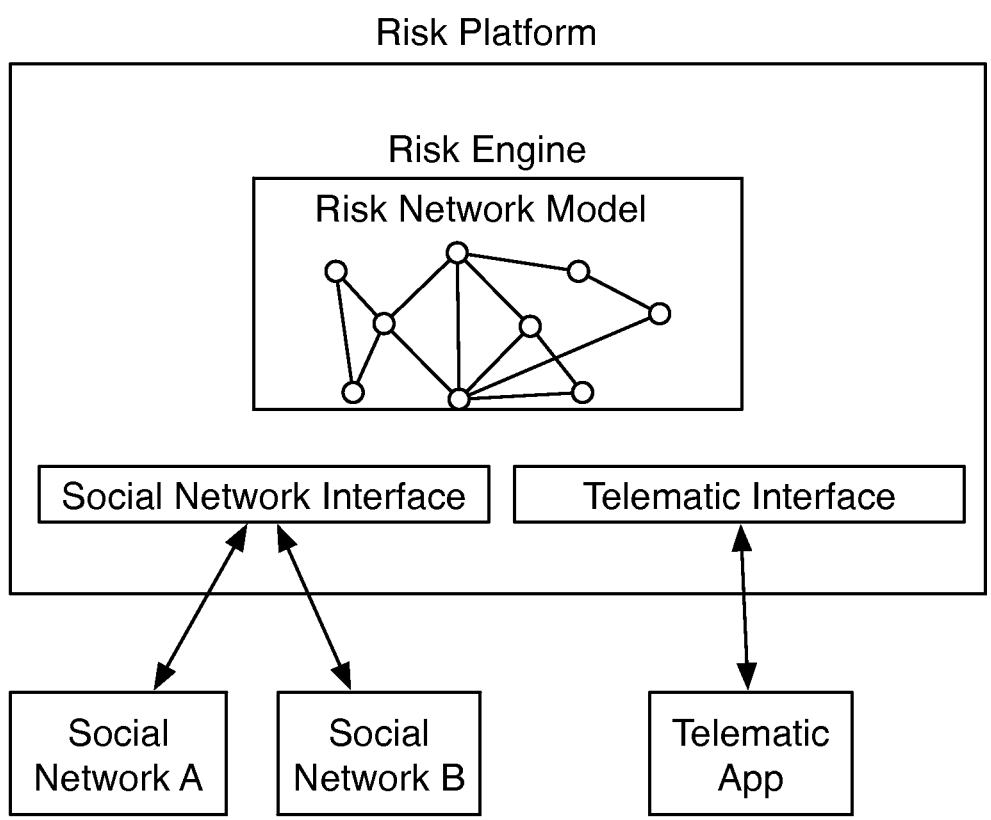
FIG. 1 is a schematic representation of a system of a preferred embodiment.

As shown in FIG. 1, a system for predicting risk through a social network of a preferred embodiment may include a social network interface and a risk engine.

The system functions to collect social network data that can be used in the assessment of risk by a risk engine. The system preferably captures and synthesizes social perceptions of risk as influenced by the connections between a user and friends, family, co-workers, and other social network connections. The system can be used by insurance companies and other institutions that rely upon risk assessments. The system provides an additional or alternative way of assessing risk beyond actuarial statistics. The system in a preferred application is used in assessing and predicting the risk of drivers, which is used in providing and pricing vehicle insurance. The system may alternatively be used in assessing health, lifestyle, financial, responsibility, and other suitable types of risk.

A social network is preferably any suitable data source that characterizes interactions, relationships, and/or connections between a network of people and entities. Social networks may include personal networks, content sharing networks, shared interest communities, and/or any other suitable social data source. A social network, as used herein, relates to a data model and interaction system of a computer system/platform. Information, communication, and data modeling are preferably facilitated through a physical computer system. The system is preferably implemented as a web hosted service or application. Users preferably access the system through a website, an application, a device, or any suitable service portal. In one variation, the social network interface preferably connects an account of the system with a third party or established social network entity. The connection to a social network entity preferably provides information on contacts and relationships. Content such as message posts, news feeds, social promotions (e.g., likes, repostings, favorites, bookmarks, etc.), posted media, and/or other content on the social network may additionally be accessed. A social network may alternatively be organically created by the system, wherein users are prompted to invite and connect with friends. In one variation, multiple social networks may be connected. The system preferably builds upon social network connections to extract stronger signals or risk in the preferred field. For example, a user may be prompted to select 10 friends that are similar or safe drivers.

The risk engine is preferably a processor that applies algorithms for synthesizing network-wide signals for risk that have been extracted based on relationship information. The risk engine preferably calculates a risk assessment for at least a subset of entities connected/registered to the system. The risk engine preferably creates a risk network model in which risk may be calculated based on the social signals obtained from a social network. The risk engine may be entirely based on the social network relationships, but other risk vectors or related data may be used. For example, personal information such as age, gender, martial status, vehicle classification, driving distance, and driving history may be used in calculating a risk assessment. In another example, data from a vehicle telematic application or device may be used to provide additional data for a user. While not all entities tracked by the system may provide personal information or telematic driving data, such data for at least one individual may be used to calibrate or influence the risk assessments from the social network.

In one implementation for assessing driver risk, a plurality of users connect their social network accounts with the system, and then users select a subset of friends they wish to add to a "driving group." The "driving group" may be positioned as a selection of friends that the user trusts, that the user would want to be evaluated with as a group, or that are close friends on the network. The collective input from multiple users gives a network wide insight and data into how risk is perceived. The condition where a network entity is trusted by multiple people may signal that the user is a trusted driver and would be a lower risk. The condition where a network entity is never selected by connections in the social network may indicate that the entity is less trusted and so would be a higher risk.

The system may additionally or alternatively include a telematic interface; the telematic interface functions to receive telematic data from an application or device that captures telematic driving data. The telematics interface can be communicatively coupled to the social network and/or the risk engine. The risk engine can utilize data from the telematics interface in outputting a risk analysis of the physical and social indicators of a user's driving risk.

2. Method for Assessing Risk Through a Social Network

Figure 2:
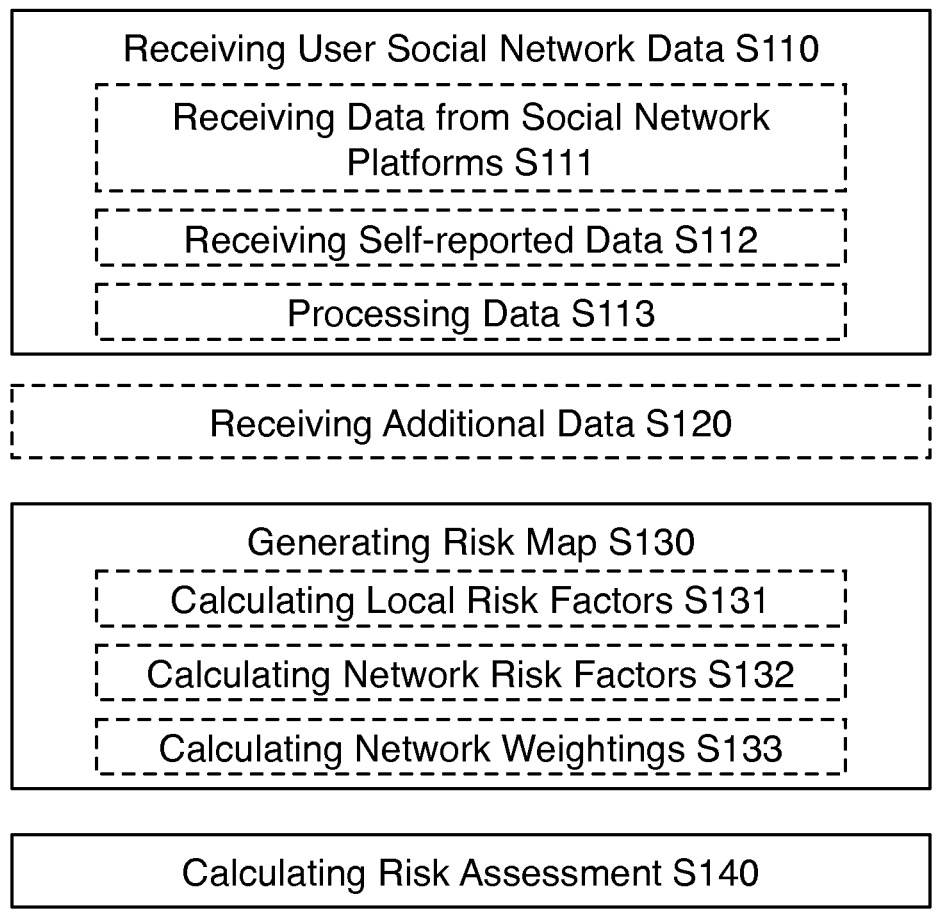
FIG. 2 is a flow diagram of a method of a preferred embodiment.

As shown in FIG. 2, a method for assessing risk through a social network of a preferred embodiment preferably includes receiving user social network data S110; generating a risk map S130; and calculating a risk assessment based on the risk map and the user social network S140. The method may additionally or alternatively include receiving additional data S120.

The method functions to use social connections as a signal for assessing risk for at least one entity. Through the method, the manner in which social network entities collectively value and interact with other social network entities may be captured and transformed into a measurable indicator of risk. The method preferably uses strong social connections or reinforced social networks to generate risk assessments. In other words, social voting, interactions, and connections are transformed to a score that correlates with some risk assessment. The method preferably uses the wealth of social information of social networks and strengthens/aligns those relationships with the field of risk assessment (e.g., driving). The method preferably relies on a correlation between an individual's risk and the risk of people they associate with. The method enables insurance companies, or risk assessment services, to evaluate an entity based on their social behavior and associations as well as statistical implications of personal information such as age, gender, martial status, vehicle classification, driving distance, and driving history. Additionally, the method can enable the risk assessment of individuals without collecting personal information, thus enabling quicker and lower barriers to insurance pricing. In other applications, the method may be used to identify and target ideal customers without requiring the user to volunteer any information. In one implementation, the method of the preferred embodiment is applied towards insuring vehicles/drivers, but the method may alternatively be applied towards any suitable insurance or risk assessment related application such as health insurance, life insurance, loan companies, industries that rely on background checks, or any suitable application. The method is preferably implemented by a risk platform substantially similar to the system described above, but the risk platform may be any suitable system.

Step S110 includes receiving user social network data. Step S110 functions to receive social network data relevant to assessing risk (e.g., risk of having a car accident) for a particular user or other entity.

User social network data may include any data related to one or more social networks of a particular user or other entity. Users typically are part of many social networks, including those formed using software platforms (e.g., Facebook, LinkedIn, Twitter), those formed through shared interests (e.g., a fly fishing club, a professional society), and those formed through other relationships (e.g., family, work, etc.). User social network data may include data on what social networks a user (or other entity) is a part of, data on others whom users are tied to through social networks, data on the nature of ties between users and others on social networks, data on how users utilize social networks, and any other suitable data. User social network data may additionally or alternatively include data related to social network platform usage; e.g., the amount of time per day a user uses a social network platform or the ads a user is displayed (or clicks on) through a social network platform Step S110 may including receiving data from any source (e.g., social network platforms, user-submitted data, insurance databases, etc.).

User social network data may assist in identifying and strengthening signals of the social network information that relate to particular types of risk. In an example where the method is applied to assessing driving risk, social network data may be measured as it relates to driving. In an example where the method is applied to assessing health risk, social network data may be measured as it relates to health.

In particular, Step 110 preferably includes receiving user social network data from social network platforms (S111) and/or self-reported user social network data (S112).

Step S111 includes receiving user social network data from social network platforms. Step S111 functions to connect to social network platforms that users are existing members of (e.g., by connecting a Facebook account) and obtain user social network data from those platforms. Step S111 may include connecting to a single social network platform or may include connecting to multiple social network platforms. If data is received from multiple platforms, the data may be used in any suitable way—for example, data from multiple platforms may be considered independently or may be considered in aggregate. Additionally or alternatively, data may only be used for some of the platforms connected in Step S111.

Step S111 preferably includes connecting to a social network platform through third-party authentication APIs (e.g., Facebook Connect, OpenID), but may additionally or alternatively include receiving user social network data in any suitable manner.

Step S111 preferably includes receiving a default data set from a social network platform (e.g., any person who connects Facebook may be asked to share their friends list and certain demographic information). Additionally or alternatively, Step S111 may include allowing users to customize datasets from each source; for example, a user may optionally choose to allow the method to receive data on a user's check-ins (which may be used in determining travel patterns). Users may additionally grant capabilities to interact with social connection information (or any other relevant permissions). The method 100 may include incentivizing users to expand permissions in any suitable way (e.g., notifying users that they may receive a lower rate if they allow expanded permissions).

Step S112 includes receiving self-reported user social network data. Step S112 functions to obtain social network data from a user directly (as opposed to through a social networking platform). Self-reported user social network data may be used to refine social network platform data or may be used independently of (or complementarily to) social network platform data. Self-reported user social network data may include any social network data as described above; self-reported user social network data may additionally or alternatively include any other information about a user's social network.

Figure 3:
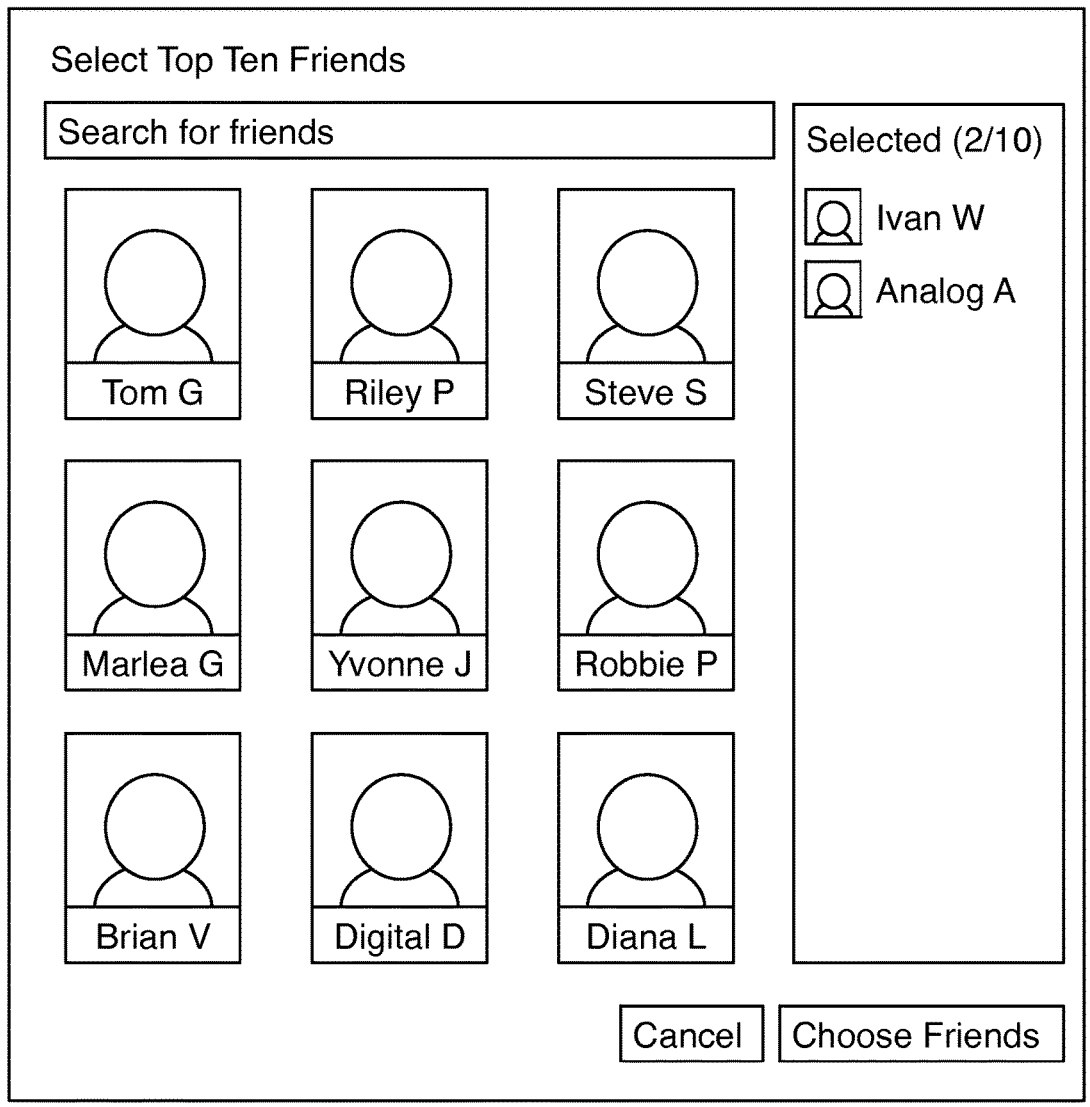
FIG. 3 is an exemplary screenshot of an implementation of receiving user ranking of relationships of a preferred embodiment.
Figure 4:
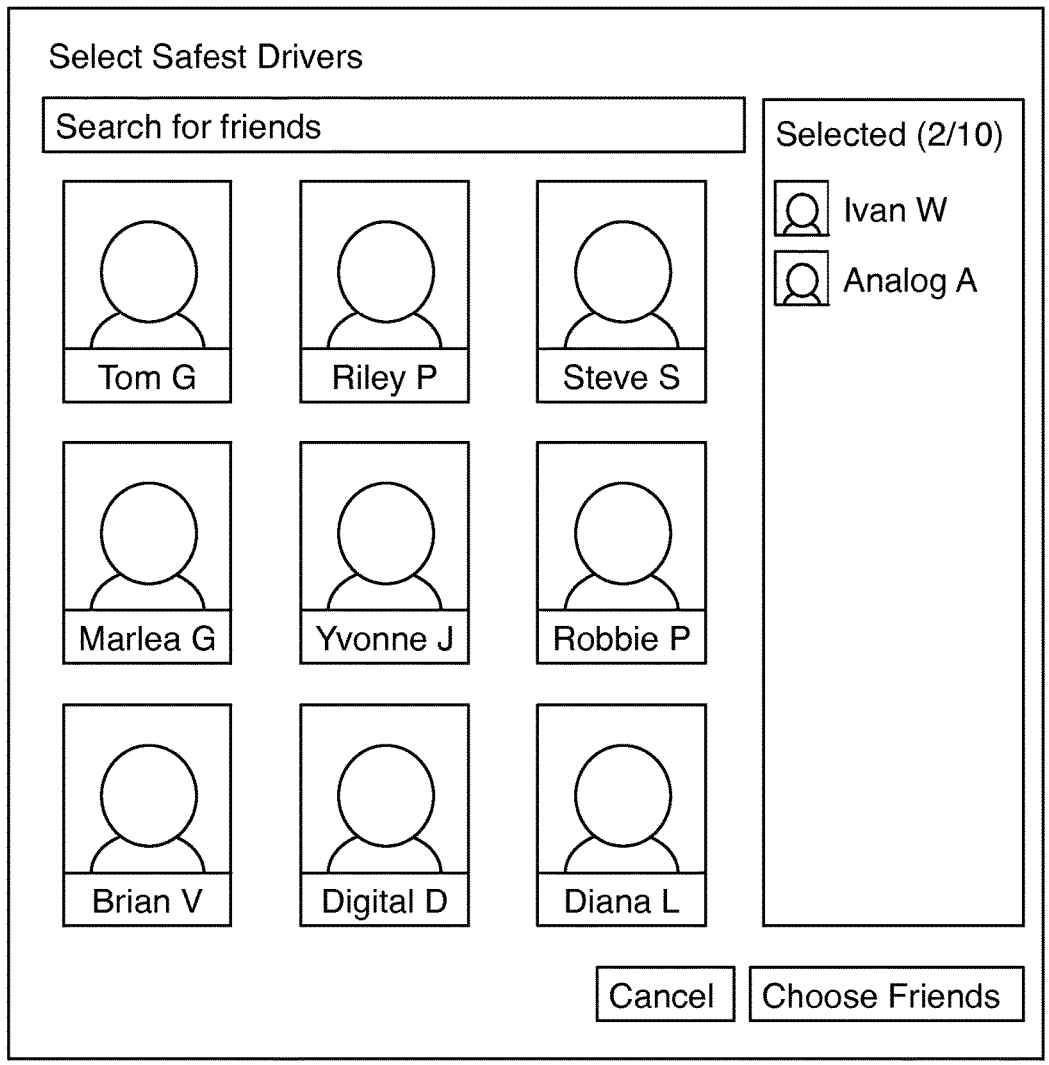
FIG. 4 is an exemplary screenshot of an implementation of receiving user ranking of relationships of a preferred embodiment.

Self reported user social network data may be used to refine social network platform data; for example, Step S111 may include receiving user rankings or groupings of relationships on an existing social network, as shown in FIG. 3. These rankings or groupings (e.g., select the ten best friends of your social network connections) may be used to collect user input on relationships relevant to evaluating risk of a user. User selection can be used to organically create signals of how individuals assess the risk of social network connections. In one preferred implementation, an interface is displayed allowing a user to select social network connections (as shown in FIG. 3). The subset of social network connections may be automatically selected to improve the information covered by the risk platform (e.g., balance out the evaluation of entities). Alternatively, the user may be prompted to select friends to form a group related to the field of risk assessment. For example, the selected friends may be a "driving club" when the risk assessment is for insuring a vehicle. Users may be explicitly requested to select the safest drivers of their social network connections, as shown in FIG. 4. Another exemplary group may be a fitness/health group for health insurance. The selection of a friend is preferably interpreted as a vote of confidence by that entity.

Selected relationships may form a minimal social network with which to assess the risk of an entity. A user may have numerous social connections on a given social network, but only a subset of those social network connections may have a strong correlation to the risk of an individual. For example, the measuring of relationships of a user in a social network will preferably identify entities with which a user closely associates (e.g., a close circle of friends, family members, coworkers, etc.). Alternatively, all social network connections may be evaluated. Social network connections and data may be un-weighted or may be weighted (e.g., by the strength or nature of the connection).

Step S111 may additionally or alternatively include allowing a user to create or identify a social network through other means; for example, a user may be asked to provide names (and/or other data) identifying friends that the user considers to be good drivers. This data may be used in combination with other data, such as driver records or data from an insurance database. User-created or identified social networks may be used similarly to those of social network platforms or in any other suitable manner.

Step S110 may additionally or alternatively include processing user social network data S113. Step S113 preferably includes analyzing user social network data to obtain insights about a user or a user's network; for example, Step S113 may be used to automatically identify strong relationships or relationships of a particular type. Step S113 may additionally or alternatively include characterizing, categorizing, or otherwise analyzing social network data. Natural language processing may be implemented to determine the nature and context of messages and content on social networks, which may be used to indicate types of relationships. For example, such content processing may identify relationships such as family relationships (e.g., referring to an entity by a family title like mom or dad), context of relationship (e.g., are they co-workers by talking about work, are they classmates, do they attend the same events, do they share hobbies, etc.), or other properties of a relationship. Step S113 may additionally include identifying interests and characteristics of a user such as determining if a user frequently attends bars or nightclubs; if a user enjoys risky activities; if a user participates in healthy activities/sports; if the sentiment of a user is happy, sad, or angry; or any suitable patterns from content.

Step S113 may additionally include supplementing self-reported data received in Step S112. For example, if a user lists information identifying five friends the user believes to be good drivers, Step S113 may include looking up driving records of those friends based on the information provided in Step S112.

Step S120 includes receiving additional data. Step S120 functions to provide data not directly related to user social networks that may be relevant to assessing risk. Additional data may include actuarial statistics from personal information and/or historical logging data (e.g., driving data from a vehicular telematics device or applications). Additional data is preferably objective data, but may additionally or alternatively be subjective; for example, a user may be asked to rate his or her own driving ability. Some additional examples of additional data include data on location and routes, movements, and driving patterns (e.g., steering and braking characteristics).

Step S120 may include receiving such data from an external source (e.g., another app on a phone, an internet connected service, etc.), but may additionally or alternatively include receiving additional data using sensors connected to the system operating the method; for example, Step S120 may include receiving data from services and sensors accessible on a mobile device such as GPS sensors, location services, accelerometers, gyroscopes, presence sensors, and/or any suitable input signal. The telematic data may be used with outside data sources to correlate additional properties of driving. The additional properties of driving may be generated as part of Step S120 or alternatively at any other time and by any system.

Additional data may be used as part of objective risk assessments; objective risk assessments are preferably used in combination with subjective risk assessments (e.g., how others rate a user's driving ability) to improve assessment quality and reliability, but may additionally or alternatively be used for any suitable purpose. The social network can provide relative social perceptions of risk, and in combination with objective data (e.g., measurable and more absolute values), a few absolute risk assessments can propagate to provide improved confidence and resolution of a risk assessment for an entity without objective data. For example, within a circle of friends, one friend may be viewed as very safe driver, but if absolute risk assessment data indicates that either that driver or the users selecting that driver are very high risk drivers, then that may indicate that the relative label of "safe driver" within that circle of friends does not necessarily signal that the driver is globally considered a safe driver. That driver may just be a safe driver amongst his friends.

Actuarial data may be obtained by collecting personal information from a user through a user interface, but the actuarial data may alternatively be provided by an outside source such as an insurance company. Logging data is preferably obtained by a vehicle telematic device for driver risk assessment, but the logging data may alternatively be obtained by any suitable device such as a pedometer/activity monitor for health risk prediction. Vehicle telematic devices or applications preferably sense how a car is driven. In one preferred implementation, the telematic device is an application that uses geolocation sensing, accelerometers, gyroscopic sensors, audio, and/or any suitable sensor to monitor the driving of a car. The driving data for a telematic device is preferably mapped to a single entity logged in on the application. Alternatively, the telematic device may be a standalone device that interfaces or connects to a vehicle. The telematic device preferably monitors acceleration, deceleration (e.g., braking), speeds (e.g., compared to speed limits), stability of steering (e.g., how smoothly is the car turned), volume of the stereo, location of driving routes, time of travel, weather when traveling, and/or any suitable property related to driving. In one variation, a vehicle telematic application may detect the presence of another user in a car. The vehicle telematic application may additionally collect data relevant to measuring social network relationships by detecting the role of various users in a car, such as a driver and passenger. This may be used to detect when entities carpool or share rides. Carpooling may be used as an additional signal in measuring relationships. If a user is a passenger in another users car, then that other user may be assumed to have some level of trust in the driving user. A telematic application operable on a user's phone may detect the presence of other phones through phone-to-phone communication (e.g., Bluetooth, NFC, etc.), detecting shared geographic location paths, detecting a beacon within a car, or through any suitable sensing technique. The role of a user may additionally be detected by characterizing audio signatures, using a triangulation of beacons, asking a user for input, or any suitable technique.

Step S130 includes generating a risk map. Step S130 functions to propagate risk assessments through relationships of social networks, synthesizing user social network data (and potentially additional data) into a risk map. In a preferred embodiment, the social network relationships and how entities value, interact, and relate in those relationships can be used to determine a measure of risk. Propagating risk assessments preferably describes how expected risk can be collectively calculated.

For example, if several entities add a user to a list of "best drivers", then that user may be assessed as lower risk than a user who has not been added to a "best driver" list. The analysis of the social network relationships preferably provides a subset of relationships that are used to calculate social risk assessments across known entities, but all social network connections may alternatively used.

In one preferred variation, heuristics may identify patterns that impact the propagation of risk. For example, risk may propagate based on the ranking of the strength of a social network connection (e.g., frequency of messaging). In another example, risk may propagate according to a first function for one type of relationship (e.g., family members), a second function for a second type of relationship (e.g., close friend), and a third function for a third type of relationship (e.g., co-worker). In another variation, machine learning and other pattern identifying algorithms may be used to algorithmically identify how patterns of social network connections impact the propagation/calculation of risk through the social network. As more people use the risk platform, more entities are added, risk assessments may be propagated progressively as information is obtained or periodically updated.

Figure 5:
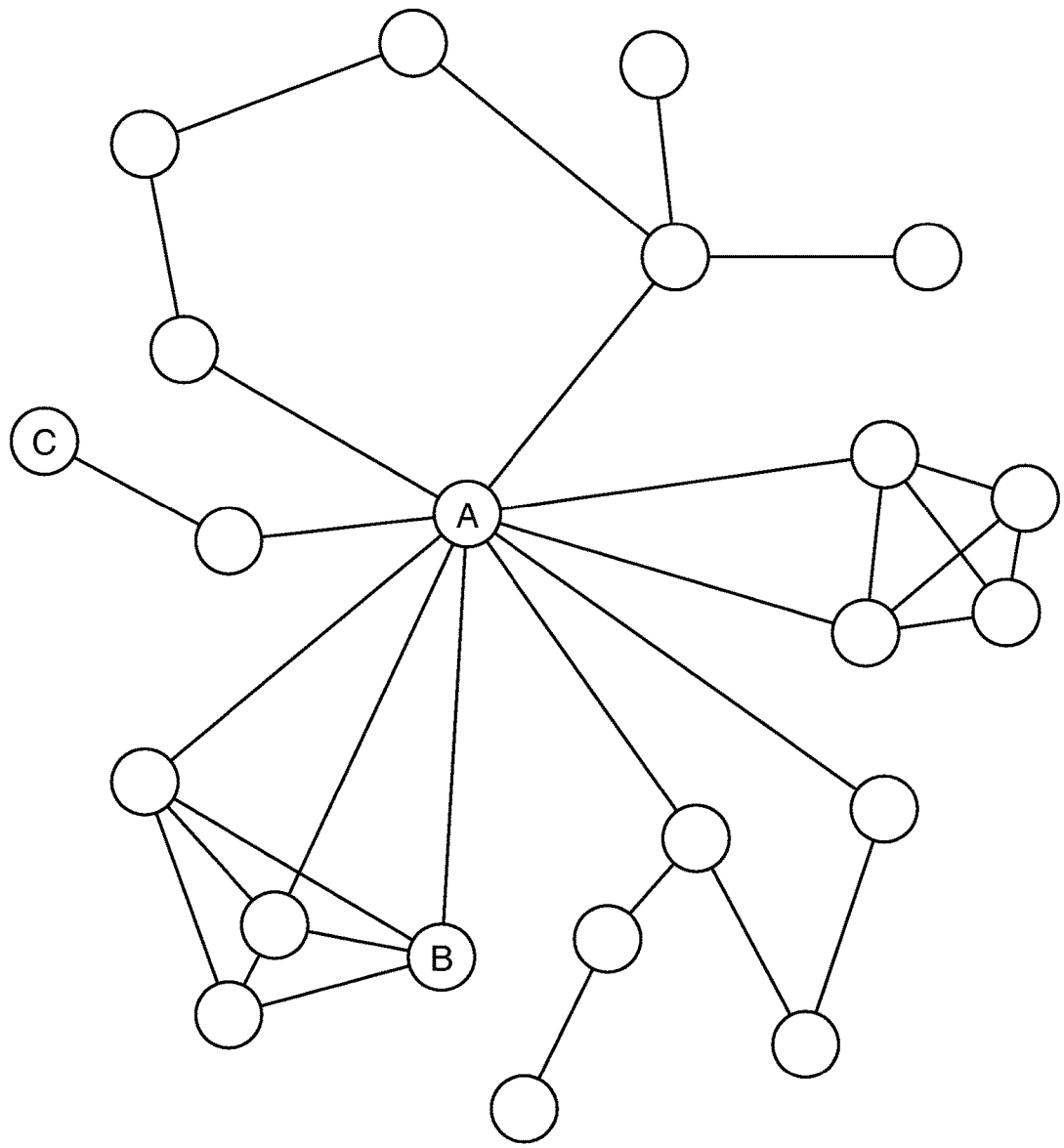
FIG. 5 is an exemplary network diagram.

Risk maps preferably represent the combined effect of factors contributing to risk (specifically, factors affecting a particular risk assessment). These risk factors may be represented in a number of ways; for example, previous parts of this application distinguish between subjective and objective data (and thus subjective/objective factors). Factors may also be distinguished as local and network factors; network factors depend on the structure (and weight) of social network connections, while local factors are independent of social network connections. For example, consider the social network of a user 'A', as shown in FIG. 5. A local factor might include data on A's driving patterns from a telematic application; this data is independent of who A is friends with (and thus local). A network factor might include that user B (a friend of A's), has a DUI—or that user C (a friend of a friend of A's) has never been in an accident. The risk factor in the former case is that user B both has had a DUI and is a friend of A—the factor relies on the existence of a relationship between user A and user B. As previously mentioned, the nature of that relationship preferably plays into how risk factors are evaluated; for example, the effect of user B's DUI may be more relevant to assessing the risk of user A than the effect of user C's good driving record is. In other words, the contribution of user B's risk factor data is weighted more heavily than the contribution of user C's risk factor data.

Given this framework, a risk map for a particular user or entity can be generated by calculating local and network factor metrics as well as network-dependent weightings for the network factors. Step S130 may generate a risk map in this way: Step S130 preferably includes calculating local risk factor metrics S131, calculating network risk factor metrics S132, and calculating network risk factor weightings S133.

Step S131 includes calculating local risk factor metrics. Step S131 functions to evaluate local risk factors from data received in Step S110 and/or Step S120. Step S131 preferably includes calculating local risk factor metrics from local risk data (e.g., local risk data selected from user social network data and/or additional data). Local risk data is preferably any data related to local risk factor metrics; for example, data on a user's driving habits or demographic data for a user. A local risk factor metric preferably serves as a quantitative representation of the extent to which a user represents a particular risk factor (or alternatively, the extent to which any relevant data represents a particular risk factor).

Calculating local risk factor metrics S131 preferably includes processing local risk data for each local risk factor into a single local risk factor metric; additionally or alternatively, Step S131 may include processing local risk data for one or more local risk factors into multiple local risk factor metrics per risk factor. Processing local risk data preferably includes using a scoring algorithm to calculate a local risk factor metric, but may additionally or alternatively include calculating local risk factor metrics in any suitable way. Processing local risk data may include categorizing, aggregating, characterizing, or otherwise analyzing local risk data.

For example, one local risk factor metric might include a speeding ticket risk factor metric that represents a user's speeding ticket history as a number from one to ten:

$$M_s = \min(S_1 + 2S_2 + 5S_3, 10)$$

where $S_1$, $S_2$, $S_3$ represent the number of speeding tickets a user has received (where $S_1$ is the number of tickets for speed between 0-10 MPH over the limit, $S_2$ is the number of tickets for speed between 10-20 MPH over the limit, and $S_3$ is the number of tickets for speed 20 MPH or greater over the limit).

In this example, a risk factor draws from a single data source (speeding ticket counts), but risk factors may additionally or alternatively draw from multiple sources and/or types of data; for example, a risk factor metric for driving patterns may be calculated from a combination of accelerometer data, average route length, and average speed from a telematic device as well as accident history.

Step S132 includes calculating network risk factor metrics. Step S132 functions to evaluate network risk factors from data received in Step S110 and/or Step S120. Step S132 is preferably substantially similar to Step S131 with the exception that network risk factor metrics are calculated from network risk data, as opposed to local risk data.

Network risk factor metrics are preferably evaluated for individual entities in a user's network or for individual entities in a subset of a user's network (e.g., a DUI network risk factor metric may simply be the number of DUIs each person in a user's network has received). Additionally or alternatively, network risk factor metrics may be evaluated for a group of entities in a user's network; for example, a count of the total number of DUIs obtained by persons in a user's network.

Network risk data is preferably any data related to network risk factor metrics; for example, data on driving habits of entities in a user's network or ratings of a user's driving habits from entities in a user's network. A local risk factor metric preferably serves as a quantitative representation of the extent to which a user's network represents a particular risk factor (or alternatively, the extent to which any relevant data related to a user's network represents a particular risk factor).

Calculating network risk factor metrics S132 preferably includes processing network risk data for each network risk factor into a single network risk factor metric; additionally or alternatively, Step S131 may include processing network risk data for one or more network risk factors into multiple network risk factor metrics per risk factor. Processing network risk data preferably includes using a scoring algorithm to calculate a network risk factor metric, but may additionally or alternatively include calculating network risk factor metrics in any suitable way. Processing network risk data may include categorizing, aggregating, characterizing, or otherwise analyzing network risk data.

For example, one network risk factor metric might include the same speeding ticket metric used as a local risk factor metric; except instead of the metric being applied to the user, the metric is applied to entities within the user's network (and thus includes additional information describing the relationship of the entity to the user). That additional information may simply be that a relationship between the entity and the user exists (e.g., the entity is in the user's network) or may be more specific (e.g., as to the entity's identity or the nature of the relationship between user and entity). In this example, a risk factor draws from a single data source (speeding ticket counts), but risk factors may additionally or alternatively draw from multiple sources and/or types of data; for example, a risk factor metric for driving patterns may be calculated from a combination of accelerometer data, average route length, and average speed from a telematic device as well as accident history.

Risk factor metrics may or may not be standardized to one another; for example, risk factor metrics may all output scores from zero to one or risk factor metrics may have separate scoring guidelines for each metric.

Step S133 includes calculating network risk factor weightings. Step S133 functions to determine how user social network structure affects network risk factors.

Step S133 preferably includes calculating network risk factor weightings based upon the structure of a user's social network, but may additionally or alternatively include calculating network risk factor weightings based on any suitable data. User social network data relating to network structure may include the order of connections (e.g., first order, second order, etc.), the number of mutual connections, the duration of connection (e.g., how long two people have been connected), or any other suitable data. Note that throughout this document, "order of connection" refers to network order (i.e., number of hops between nodes) as opposed to temporal order (i.e., which node is connected first temporally).

Figure 6:
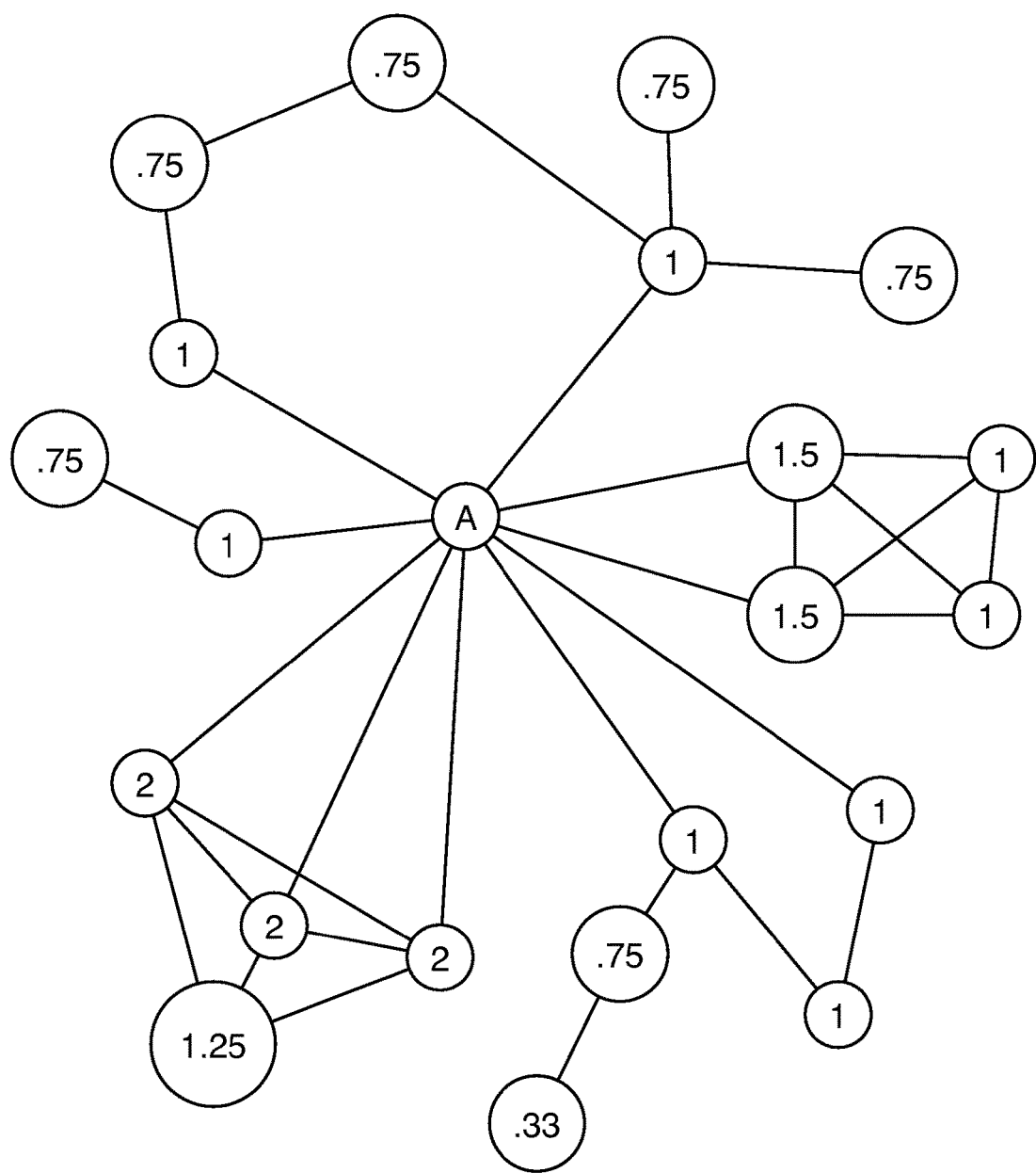
FIG. 6 is an exemplary network diagram with connection weightings.

Network risk factor weightings are preferably calculated per entity. For example, as shown in FIG. 6, network risk factor weightings may be calculated for a user's entire network by using the following formula:

$$w_i = \frac{2 + M_{1i}}{2O_i}$$

where $M_{1i}$ is the number of an entity's first order connections that are also first order connections with the user, and $O_i$ is the minimum order of the connection between user and entity.

Network risk factor weightings may additionally or alternatively be calculated for a group of entities or for any other network structure or sub-structure. For example, it may be determined that any first order connections have a weighting of two, while all other connections have a weighting of zero. As another example, all family members in a network may have double the weight of other entities in the network.

Network risk factor weightings may be dependent solely on network structure, but may additionally or alternatively be dependent on other criteria (for example, network risk factor weightings may increase if social network data indicates that a user frequently converses with an entity over the social network platform). This is also an example of a network risk factor weighting is dynamic; that is, the weighting may change over time (even if the network structure itself does not).

Network risk factor weightings may also be affected by aggregate measures (e.g., weightings may be normalized by the total number of people in your network) or by other data (e.g., if a user's network is primarily composed of older people, weightings may change the ratio between weightings of very close friends and more distant ones).

Network risk factor ratings may be different for each network risk factor, or may be identical. For example, the weighting of network risk factor metrics for a reckless behavior metric may extend to a user's entire second-order network, while weighting for a health issues metric may only extend to family members in a user's network.

Figure 7:
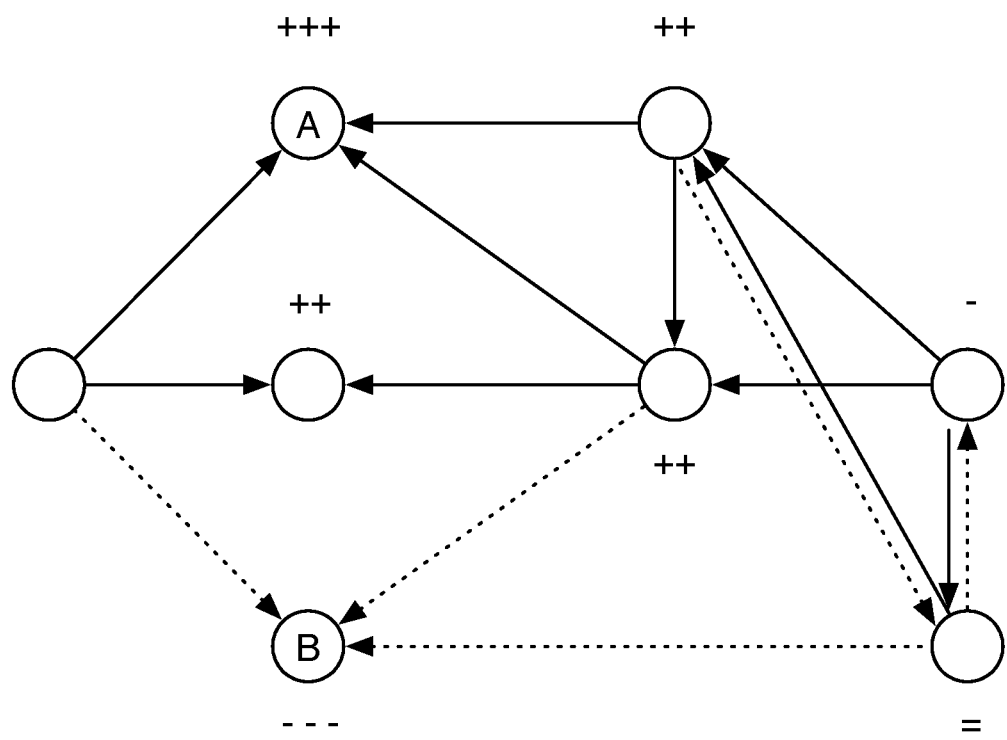
FIG. 7 is an exemplary network diagram.

While the previous examples describe the calculation of a risk map for a user, this process may also be used to calculate a risk map for multiple users simultaneously, as shown in FIG. 7. In this example, a network of friends may select each other for "safe driver" lists. Friends that are selected may be notified of the user selection and may be enabled to confirm the relationship, reciprocate the relationship, ignore the relationship, or deny the relationship. Relationship responses by a second entity can be used as a signal of the risk of a user. If user A adds user B to a "driving club", but user B does not add user A, then that may signal that user B has lower confidence in the safe driving practices of user A. As shown in FIG. 7, the collective entities of a social network selecting other entities can signal the socially perceived risk of entities. Selection of an entity can contribute to a signal that indicates the selected entity has lower risk. Additionally, indicating that a user has a relationship with someone who has a low risk may signal that the user would have low risk. As in the exemplary network of FIG. 7, entity A may be endorsed by three other users and thus would have a good risk assessment (low risk). If entity B is not endorsed by any social network connections, then entity B may be penalized and receive a bad risk assessment (e.g., high risk).

Step S140 includes calculating a risk assessment based on the risk map and the user social network data. Step S140 functions to generate a risk assessment score (or scores) for an entity; alternatively, Step S140 may include calculating and generating any suitable risk assessment criteria. The risk assessment may be generated directly during the propagation of risk assessment in Step S130. Alternatively, Step S130 may generate parameters that can then be used to calculate a risk assessment for an individual. Personal information may be collected and used with the existing social network risk assessment parameters to calculate the final risk assessment. As new personal information and risk assessments are generated, the data is preferably fed back into the risk calculations for the social network. Additionally, the method may include providing various access interfaces to query risk assessments of an individual. The interfaces for the risk platform preferably enable outside services to access and use the risk assessment generated by the method. The query interface may allow an application to query and obtain a response for users with particular risk assessment characteristics (e.g., high risk or low risk users), risk assessment characteristics along with personal information characteristics (e.g., low risk users of a particular age or gender, from a particular region), risk assessment characteristics and a type of social network relationship (e.g., users with friends with low risk), particular confidence levels in risk assessments, or any suitable type of query.

Figure 8:
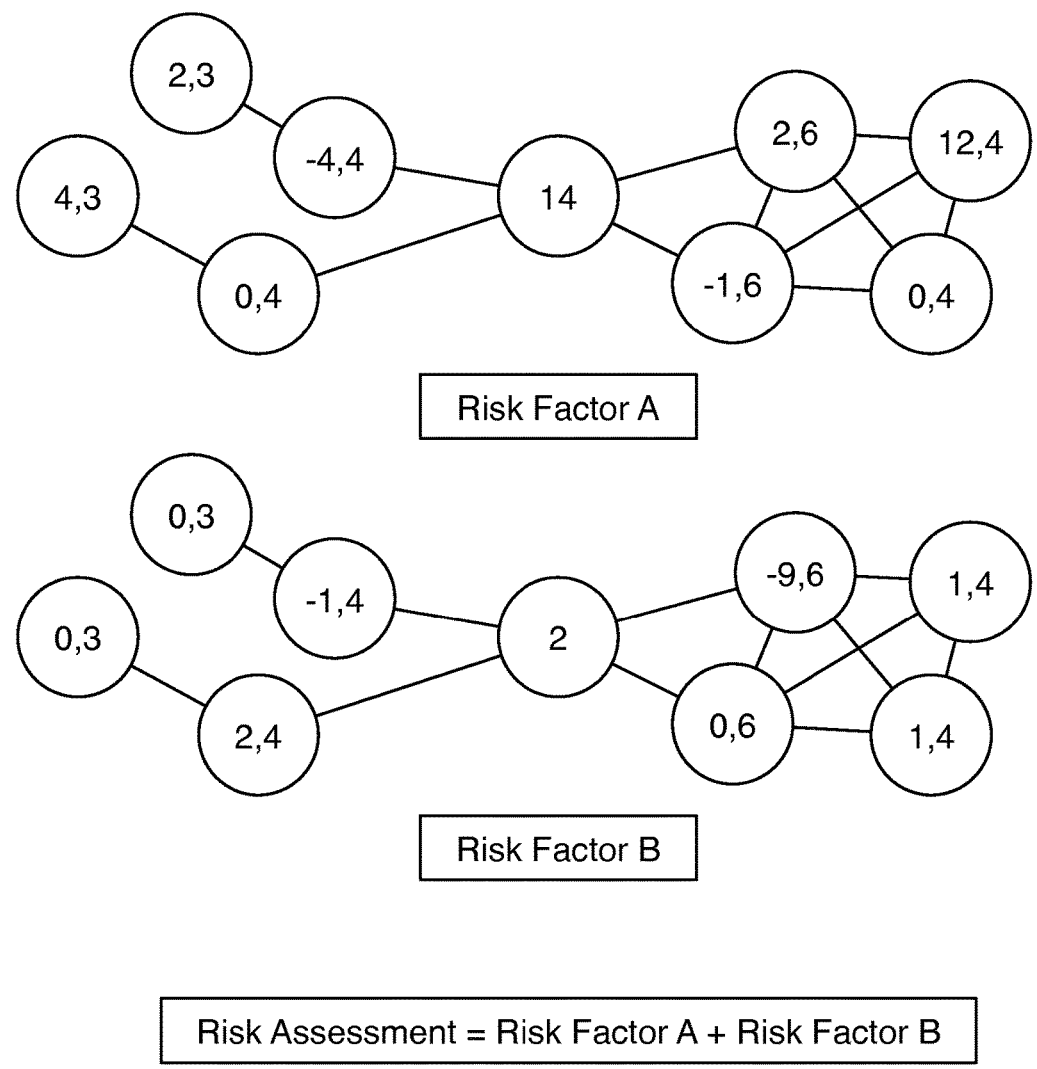
FIG. 8 is an exemplary representation of risk factor metrics using a network diagram.

Step S140 preferably uses data received in Step S110 and Step S120, as well as the risk map generated in Step S130, to calculate a final risk assessment. Risk assessments are preferably calculated from a combination of risk factor metrics. For example, a risk map may be shown with values for two risk factors. Local risk factor metrics may be represented simply as the value of the center node (in this example, the user), while network risk factor metrics may be represented as A, B where A is a network risk factor metric for a particular entity and B is the network weight associated with that entity, as shown in FIG. 8. If the risk assessment is simply the sum of the two risk factor metrics, the risk assessment for the user may be found as $$R_A = 14 + 4(0-4+12+0) + 3(2+4) + 6(2-1) = 70$$

$$R_B = 2 + 4(1+1-1+2) + 3(0+0) + 6(0-9) = -40$$

$$R = R_A + R_B = 30$$

Risk assessments may additionally or alternatively be calculated from any algorithm or operation operating on data received in Steps 110 and Step S120 and/or the risk map generated in Step S130.

The system and method of the preferred embodiment and variations thereof can be embodied and/or implemented at least in part as a machine configured to receive a computer-readable medium storing computer-readable instructions. The instructions are preferably executed by computer-executable components preferably integrated with the risk platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for calculating driver risk based on a GPS sensor and social network data to improve location sensor-based determination of the driver risk associated with a motor vehicle, the method comprising:
   connecting to an account, associated with a user, on a social networking platform through an API;
   receiving user social network data at a web hosted service system from the social networking platform, comprising a first list of entities connected to the user through the social networking platform;
   collecting GPS data received at the GPS sensor of a mobile device comprising the GPS sensor, a processor, a display, and a wireless communication transceiver, wherein the GPS data is indicative of driving habits of the user;
   wirelessly receiving the GPS data at the web hosted service system from the mobile device, where the web hosted service system comprises a computer processor system;
   calculating, by the computer processor system of the web hosted service system, a local driving pattern risk factor metric based on the GPS data, wherein calculating comprises:
      extracting an average route length from the GPS data, and
      computing a value of the local driving pattern risk factor metric based on the average route length, wherein the value is positively correlated with the average route length;
   calculating, by the computer processor system of the web hosted service system, a network risk factor metric using a set of network risk factor weightings based on the user social network data, wherein calculating comprises:
      computing a value of each of the set of network risk factor weightings, wherein the set of network risk factor weightings and the list of entities defines a one to one correspondence between the value and an entity of the list of entities, wherein the value is proportional to an interaction frequency between the user and the entity;
      computing a total value of the network risk factor metric, wherein the total value is proportional to a weighted sum over the list of entities of a set of individual risk factor metrics associated with the list of entities, wherein the set of individual risk factor metrics and the list of entities defines a one to one correspondence, wherein each summand of the weighted sum is weighted by the value of each of the set of network risk factor weightings;
   controlling the computer processor system of the web hosted service system to generate a driver risk map based on the local driving pattern risk factor metric and the network risk factor metric;
   using the driver risk map to calculate a driver risk assessment at the computer processor system of the web hosted service system, thereby improving quality of the driver risk assessment through using a combination of the local driving pattern risk metric and the network risk factor metric; and
   in response to calculating the driver risk assessment, controlling a query interface to remotely provide the driver risk assessment.

2. The method of claim 1, wherein the driver risk assessment is an assessment of risk for motor vehicle insurance.

3. The method of claim 2, further comprising receiving historical logging data from a telematic application; wherein calculating the driver risk assessment comprises calculating the driver risk assessment based on the historical logging data.

4. The method of claim 3, wherein historical logging data includes user driving pattern data.

5. The method of claim 1, wherein the driver risk assessment is an assessment of risk for health insurance.

6. The method of claim 1, further comprising receiving self-reported user social network data.

7. The method of claim 6, wherein self-reported user social network data comprises a second list of entities; wherein the second list of entities is selected by the user from the first list of entities.

8. The method of claim 7, wherein network risk factors are evaluated for individual entities.

9. The method of claim 8, wherein network risk factors are evaluated only for individual entities of the second list of entities.

10. The method of claim 7, wherein network risk factors are evaluated for entity groups.

11. The method of claim 7, further comprising calculating network risk factor weightings based on a social network structure of the user.

12. The method of claim 11, wherein social network structure comprises order of connections and number of mutual connections for entities of the first list of entities.

13. The method of claim 8, further comprising calculating network risk factor weightings for each entity of the second list of entities based on order of connections and number of mutual connections.

14. The method of claim 12, further comprising calculating network risk factor weightings for each entity of the first list of entities based on order of connections and number of mutual connections.

15. The method of claim 10, further comprising calculating network risk factor weightings for entity groups.

16. The method of claim 1, wherein receiving the user social network data comprises receiving user social network data according to a set of permissions set by a user through the social networking platform.

17. The method of claim 1, further comprising processing user social network data to determine relationship context.

18. The method of claim 9, further comprising processing user social network data to determine user interests.

19. The method of claim 1, wherein the mobile device comprises a set of motion sensors mounted at the mobile device during the driving of the motor vehicle by the driver, and wherein the method comprises:
  wirelessly receiving, at the web hosted service system, motion sensor data sampled at the set of motion sensors; and
  in response to wirelessly receiving the motion sensor data at the web hosted service system, controlling the computer processor system of the web hosted service system to determine an orientation of the mobile device relative the motor vehicle based on the motion sensor data, wherein calculating the local driving pattern risk factor metrics comprises calculating the local driving pattern risk factor metrics based on the GPS data and the motion sensor data, thereby facilitating the improvement of the quality of the driver risk assessment.

20. A method for calculating risk based on location sensors and social network data to improve location sensor-based determination of the risk, the method comprising:
  receiving user social network data at a web hosted service system from a set of users;
  collecting GPS data received at GPS sensors of mobile devices, each comprising a GPS sensor of the GPS sensors, a processor, a display, and a wireless communication transceiver, wherein the GPS data is indicative of driving habits of the set of users;
  wirelessly receiving the GPS data at the web hosted service system from the mobile device, where the web hosted service system comprises a computer processor system;
  calculating, by the computer processor system of the web hosted service system, local driving pattern risk factor metrics based on the GPS data, wherein calculating comprises:
    extracting an average route length associated with each of the set of users from the GPS data, and
    computing a value of the local driving pattern risk factor metric associated with each of the set of users based on the average route length, wherein the value is positively correlated with the average route length;
  calculating, by the computer processor system of the web hosted service system, network risk factor metrics using network risk factor weightings based on the user social network data, wherein calculating comprises:
    computing a value of a network risk factor weighting associated with each of the set of users, wherein the value is proportional to an interaction frequency between each of the set of users and each other user of the set of users;
    computing a value of a network risk factor metric associated with each of the set of users, wherein the value is proportional to a weighted sum over the set of users of a set of individual risk factor metrics associated with each of the set of users, wherein the set of individual risk factor metrics and the set of users defines a one to one correspondence, wherein the weighted sum is weighted by the value of the network risk factor weighting associated with each of the set of users;
  controlling the computer processor system of the web hosted service system to generate a risk map for all users of the set of users based on the local driving pattern risk factor metrics and the network risk factor metrics;
  calculating a risk assessment for each user of the set of users based on the risk map and the user social network data; and
  in response to a request for a driver risk assessment for a target user, controlling a query interface to remotely provide the driver risk assessment.

21. The method of claim 20, wherein receiving user social network data comprises receiving from each user of the set of users a list of users; wherein calculating the risk assessment for each user comprises calculating the risk assessment for each user based on the list of users selected by each user.

22. The method of claim 21, wherein the list of users is a list of drivers;
  wherein the risk assessment is an assessment of risk for motor vehicle insurance.

* * * * *